(12) United States Patent
Oommen

(10) Patent No.: US 8,176,165 B2
(45) Date of Patent: *May 8, 2012

(54) WTA BASED OVER THE AIR MANAGEMENT (OTAM) METHOD AND APPARATUS

(75) Inventor: Paul P. Oommen, Irving, TX (US)

(73) Assignee: Nokia Mobile Phones Oy (FI)

( * ) Notice: Subject to any disclaimer, the term of this patent is extended or adjusted under 35 U.S.C. 154(b) by 2136 days.

This patent is subject to a terminal disclaimer.

(21) Appl. No.: 10/890,340

(22) Filed: Jul. 13, 2004

(65) Prior Publication Data

US 2005/0021681 A1     Jan. 27, 2005

Related U.S. Application Data

(63) Continuation of application No. 09/751,638, filed on Dec. 29, 2000, now Pat. No. 6,799,203.

(51) Int. Cl.
*G06F 13/00*     (2006.01)

(52) U.S. Cl. ......... 709/224; 709/219; 709/225; 709/250

(58) Field of Classification Search .................. 709/217, 709/219, 224, 249, 250, 223, 225, 227, 228
See application file for complete search history.

(56) References Cited

U.S. PATENT DOCUMENTS

| | | |
|---|---|---|
| 6,336,137 B1 | 1/2002 | Lee et al. |
| 6,356,529 B1 | 3/2002 | Zarom |
| 6,400,958 B1 * | 6/2002 | Isomursu et al. ............ 455/466 |
| 6,418,146 B1 | 7/2002 | Miloslavsky |
| 6,456,857 B1 | 9/2002 | Bos et al. |
| 6,529,729 B1 * | 3/2003 | Nodoushani et al. ......... 455/419 |
| 6,549,770 B1 * | 4/2003 | Marran ......................... 455/419 |
| 6,577,614 B1 * | 6/2003 | Cook et al. .................... 370/338 |
| 6,675,219 B1 | 1/2004 | Leppinen et al. |
| 7,024,187 B2 * | 4/2006 | Moles et al. .................. 455/423 |

* cited by examiner

*Primary Examiner* — Viet Vu
(74) *Attorney, Agent, or Firm* — Alston & Bird LLP

(57) ABSTRACT

A method is provided for managing the MS over the air (OTA) and at the same time maintaining backward compatibility with existing protocols and standards. The proposed method uses Wireless Telephony application (WTA).

3 Claims, 3 Drawing Sheets

WTA BASED OVER THE AIR MANAGEMENT (OTAM) METHOD AND APPARATUS

CROSS-REFERENCE TO RELATED APPLICATIONS

This invention is a Continuation and claims benefit under 35 U.S.C. Section 120 to U.S. application Ser. No. 09/751,638 filed on Dec. 29, 2000 now U.S. Pat. No. 6,799,203.

FIELD OF THE INVENTION

This invention relates generally to over-the-air management of a Mobile Station (MS) and in particular to a means for activating and managing a Mobile Station in a communication system.

BACKGROUND OF THE INVENTION

A fast and efficient method for activating and managing a MS over the air would be beneficial both for the user and the wireless service provider. For the user, this means faster and easy activation of service and flexibility in choosing the desired carrier. For the service provider, this will enable a new level of customer care.

FIG. 1 is an illustration of a communications network 100. Mobile Station 110 comprises a dynamic agent 115 and is wirelessly coupled 120 to RAN 130. RAN is coupled to a WAP Gateway/Proxy 140 which is in turn coupled to a Mobile Management Server (MMS) 150. The MMS comprises among other things a database 160.

SUMMARY OF THE INVENTION

A method is provided for managing the MS over the air (OTA) and at the same time maintaining backward compatibility with existing protocols and standards. The proposed method uses Wireless Telephony application (WTA). A OTAM Server receives an indication from the Mobile Network of change in MS parameters. The OTAM Server sends a notification to the WTA Server along with the changed MS parameters. The WTA Server creates a new service content based on the input it received and pushes its URL to the WAP Gateway. The WAP Gateway sends a service indication to the client using (SI) Push or standard PUSH. This Si contains the URL. If user interaction is required a message is also sent. If user interaction is required, the user chooses to update the MS parameters. A WSP Get request is sent to the WAP Gateway using the URL provided in the service indication. The WAP Gateway makes a WSP/HTTP conversion. The WTA Server returns the contents created above. The WAP Gateway makes the HTTP/WSP conversion. The contents are executed by the OTAM agent using MO Interface functions which update the handset parameters. The user-agent sends an acknowledgement back to the OTAM Server.

A BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION

Figure 1:
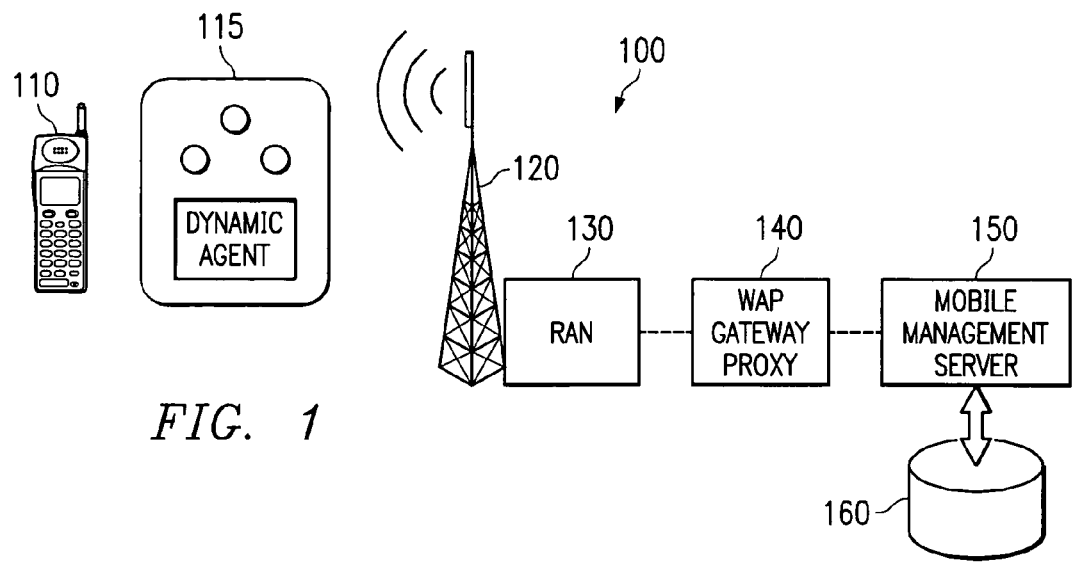
FIG. 1 is an illustration of a communications network.

The present invention provides a method for managing the MS over the air (OTA) and at the same time maintains backward compatibility with existing protocols and standards. The proposed method uses Wireless Telephony application (WTA). Information regarding WTA or WAP may be obtained at (www.wapforum.org) or *Understanding WAP; Wireless Applications, Devices, and Services*; ISBN 1-58053-093-1; Artech House Publishers (Boston; www.artechhouse.com) herein incorporated by reference. The examples describe the use of the invention in a Universal Mobile Telecommunication System (UMTS) utilizing a broadband code division multiple access (CDMA), (TDMA), method implemented with any WAP or the like, yet without restricting the invention thereto.

Information on CDMA is provided by Telecommunications Standards (TIA). The books IS-95 *CDMA* and *CDMA*2000 by Vijay K. Garg; ISBN 0-13-087112-5; published by Prentice Hall (New Jersey; www.phptr.com) and WCDMA for UMTS Radio Access for Third Generation Mobile Communications edited by Harri Holma and Antti Toskala (both of Nokia, Finland); ISBN 0 471 72051 8; published by John Wiley and Sons, Ltd (England;www.wiley.com) provide a understanding of the material. Both books are incorporated herein by reference.

Over the Air Management (OTAM) may be broadly classified into the functions of Over the Air Service Provisioning (OTASP), Over the Air Parameter Administration (OTAPA), Over the Air Software Download (OTASD) and Over the Air Mobile Diagnostics (OTAMD).

OTASP enables a new customer to subscribe the service over the air without the intervention of a third party. OTASP is subscriber initiated. In a CDMA handset this involves, but not limited to, initial programming of Number Assignment Modules (NAMs), data options, operating parameters, generation and verification of Authentication Key (A Key) and programming of Preferred Roaming Lists (PRL).

OTAPA is network initiated update, possibly with user approval, which allows a previously provisioned MS to be updated over the air. In a CDMA handset this involves network initiated programming of individual NAMs, data options, operating parameters, and updating PRLs. Handset must be provisioned before it may be updated using OTAPA methods.

Capability to diagnose a handset over the air is a desirable feature as it helps in isolating faults. OTAMD involves requesting statistics and performing diagnostic tests in the MS using a command issued from the network for testing purpose. OTAMD helps in fixing abnormalities and network directed enhancement of Quality of Service.

With the development of multiple non-converging bearer technologies, the trend is towards an adaptive multi-mode handset, which may switch to the desired bearer, hardware and software configuration on demand. Also a handset user may subscribe to different value added services which requires downloading special software modules. Such a multi-mode, multi-service handset requires downloading software modules. This may be end-user application, physical layer processing algorithms, communication protocols, etc. For example a handset may download appropriate software modules and switch from GSM mode to CDMA mode. OTASD involves techniques for downloading software modules over the air and managing software modules in a handset. Hence it may be categorized as an OTAHM function.

Figure 2:
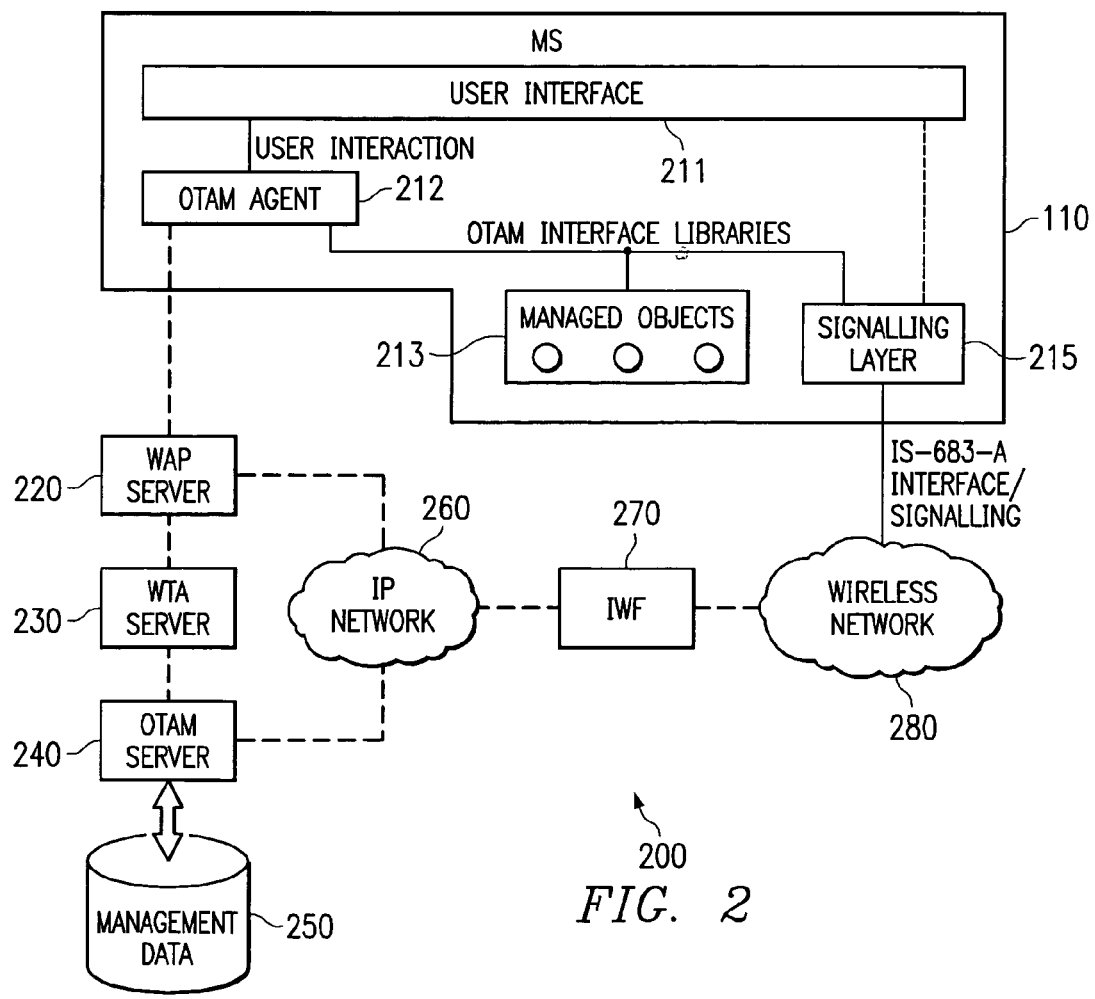
FIG. 2 is an illustration of the Mobile Station in wireless connection with a network in more detail than FIG. 1.

FIG. 2 is an illustration of the Mobile Station in wireless connection with a network in more detail than FIG. 1. MS 110, comprises an User Interface (UI) 211, an OTAM Agent 212, Managed Objects 213—objects managed by the system, and a Signaling Layer 215. MS 210 is in wireless communication with a wireless Network 280 using for example IS-683-A Interface signaling. Wireless Network 280 is coupled to IWF 270 which is coupled to an IP Network 260. IP Network 260 is also coupled to WAP Server 220 and OTAM Server 240. WTA Server 220 is between WAP Server 220 and OTAM Server 240.

Network Architecture OTAM is achieved by exchanging management messages between an OTAM Server 240 in the network and the MS 110. The OTAM agent 212 processes these messages and initiates appropriate management action. The OTAM Agent 212 is similar to a WTA user agent with the additional functionality of interfacing with the signaling layer, transport layer and managed objects in the MS described below. This allows backward compatibility since there are existing protocols and methods using transport layer and signaling layer. For example, signaling layer activity may be TIA/EIA IS-683-A based provisioning and parameter administration. WTA is an application framework for telephony services.

OTAM Server 240 sends and receives management messages and data via the WTA Server 220. This may be service indications or management data in Wireless Mark-up Language (WML) format. The OTAM Server interfaces to the IP Network facilitating the use of IP based protocols for some OTAM functions. For example, software downloads using TFTP. The interface to the Wireless Network allows provisioning and parameter administration using existing signaling layer standards. Interfacing to the IP Network and Wireless Network allows centralized management of mobile stations.

Agent Model and OTAM Interfaces

The OTAHM agent receives management-related messages and indications via the WAP gateway. The agent processes the messages and initiates appropriate management action. This may be accessing the managed objects for updating or retrieving parameters or invoking a signaling layer function.

Figure 3:
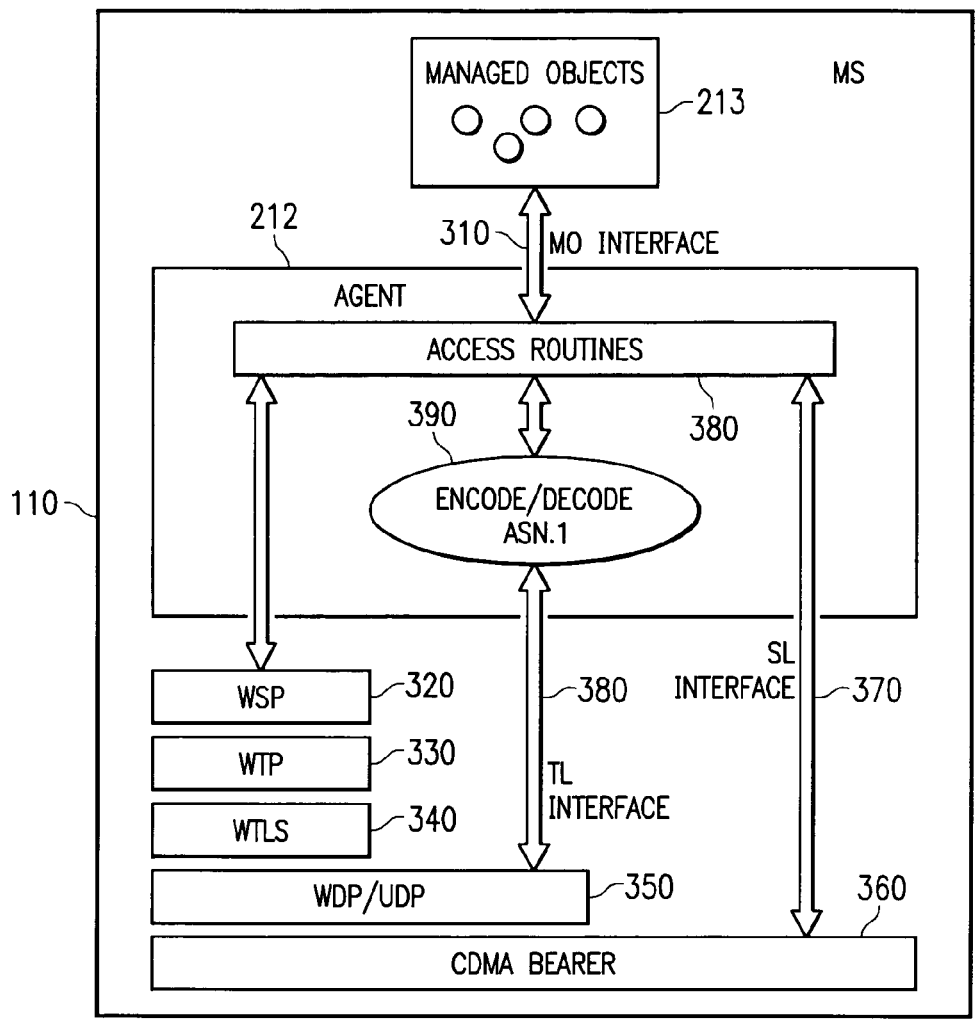
FIG. 3 is an illustration of the Mobile Station (MS) 110.

FIG. 3 is an illustration of the Mobile Station (MS) 110. MS 110 comprises Managed Objects 213, Agent 212, WSP 320, WTP 330, WTLS 340, WDP/UDP 350, CDMA Bearer 360. Agent 212 comprises Access Routines 380 Encode/Decode ASN.1 390. Various interfaces are also provided such as Managed Objects (MO) Interface 310, Transport Layer (TL) Interface, Signalling Layer (SL) Interface.

Agent 212 sends responses and acknowledgements back to OTAM Server 240 via WAP Gateway 140. Agent 212 may also send a request or notification to the Mobile Management Server 150 via WAP Gateway 140. In this case, Agent 212 creates the messages and does the appropriate content encoding and sends it. Generally, the agent has the following functions:

1. Receive/Send management messages through WAP gateway;
2. Initiate a signaling layer activity; and
3. Initiate a transport layer activity.

The basic capability of the agent is to execute Wireless Mark-up Language (WML) and WMLScript. Agent uses the Mobile Management Interface (MMI) to call management-related functions. The agent has the following three interfaces.

1. Signaling layer interface;
2. Interface to Managed Objects; and
3. Interface to Transport layer of TCP/IP.

These interfaces are described in the next section.

OTAHM Interfaces

Figure 4:
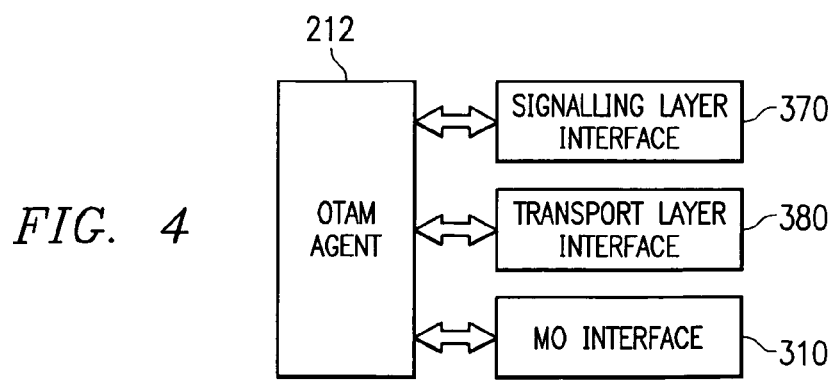
FIG. 4 shows the various interfaces to the OTAM Agent.

Referring now to FIG. 4. FIG. 4 shows the various interfaces to the OTAM Agent. OTAM Agent has interfaces to the Signaling Layer, Transport Layer and the Managed Objects. This allows integrated management and backward compatibility.

Signaling Layer Interface

An interface to the signaling layer helps backward compatibly with existing IS-683standards for OTASP/OTAPA in a CDMA Network. In situations where the network supports IS-683-A, the may use this interface OTAPA. For OTASP, the agent may directly use this interface to call a function. Signaling Layer interface (SL Interface) may used also for software downloading using data burst messages. Signaling layer interface is defined in a separate section.

Managed Objects Interface

A managed object is an external management view upon a resource to be managed. It mainly constitutes of attributes that represent properties of the software and hardware components such as version number, statistical error counters, control parameters, management operations such as reset, suspend, resume, and asynchronous events to be reported. Accessing managed objects is necessary to updating parameters in the case of OTAPA and retrieving statistics for diagnosing a MS over the air. For OTAPA and OTAMD, the agent calls the appropriate Managed Object Interface function. Managed Object Interface (MO Interface) functions are described in a separate section.

Transport Layer Interface

A transport layer interface (TL Interface) is essential to use existing TCP/IP based management protocols. In certain cases of OTAM, as in downloading software modules, existing protocols TCP/IP based protocols like TFTP or FTP may be used.

Figure 5:
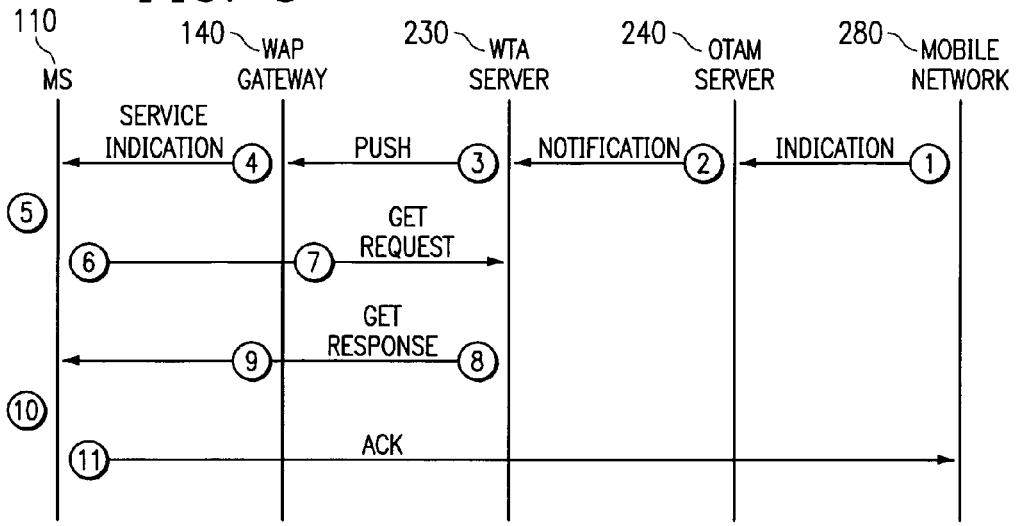
FIG. 5 is a session diagram for Over the Air Parameter Administration (OTAPA)
Figure 6:
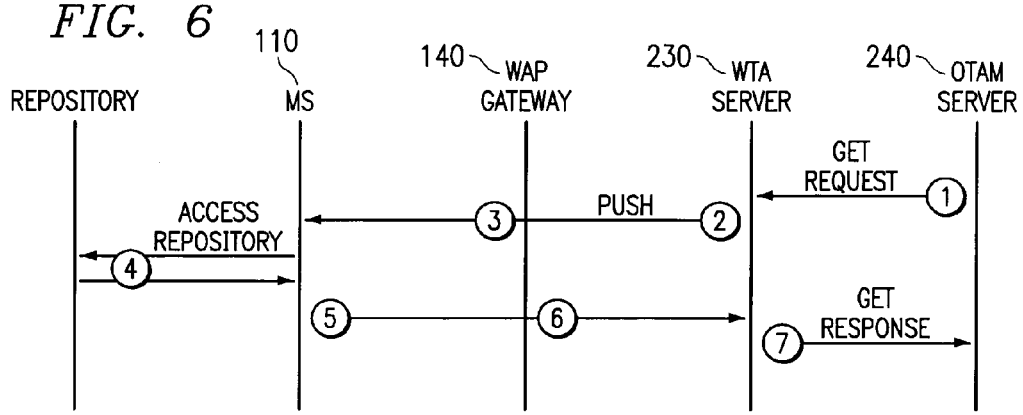
FIG. 6 is a session diagram showing Over the Air Mobile Diagnostics (OTAMD)

FIG. 5 is a session diagram for Over the Air Parameter Administration (OTAPA). This example is a use case for provisioning Telephony-related parameters over-the-air, using the WTA user agent and WTAI interfaces to update the parameters on the handset. This is an example only, modifications and variation are deemed to be in the spirit and scope of the present invention. The method/session proceeds as follows:

1. The OTAM Server receives an indication from the Mobile Network of change in MS parameters.
2. The OTAM Server sends a notification to the WTA Server along with the changed MS parameters.
3. The WTA Server creates a new service content based on the input it received in step 2 and pushes its URL to the WAP Gateway.
4. The WAP Gateway sends a service indication to the client using (SI) Push or standard PUSH. This SI contains the URL. If user interaction is required a message is also sent.
5. If user interaction is required, the user chooses to update the MS parameters.
6. A WSP Get request is sent to the WAP Gateway using the URL provided in the service indication.
7. The WAP Gateway makes a WSP/HTTP conversion.
8. The WTA Server returns the contents created in step 3.
9. The WAP Gateway makes the HTTP/WSP conversion 10. The contents are executed by the OTAM agent using MO Interface functions which update the handset parameters.
11. The user-agent sends an acknowledgement back to the OTAM Server.

FIG. 5 is a session diagram showing Over the Air Mobile Diagnostics (OTAMD). This example is a use case for querying diagnostic information from the mobile set using WTAI functions and WTA content. This is an example only, modifications and variation are deemed to be in the spirit and scope of the present invention. The method/session proceeds as follows:

1. The OTAM Server sends a "Get Request" to the WTA Server. Each request has a unique request ID.
2. The WTA Server establishes an HTTP connection to the MS and pushes the request to the WAP Gateway.
3. The WAP Gateway makes the HTTP/WSP conversion and sends the request to the MS.
4. The user-agent in the MS executes the WTA content and invokes MO Interface library functions to access the requested parameters in the MS.
5. The WTA service content uses a POST operation to return the response data, based on the accessed parameters and request ID.
6. The WAP Gateway makes the WSP/HTTP conversion.
7. The WTA Server delivers the "Response" to the OTAM Server.

Figure 7:
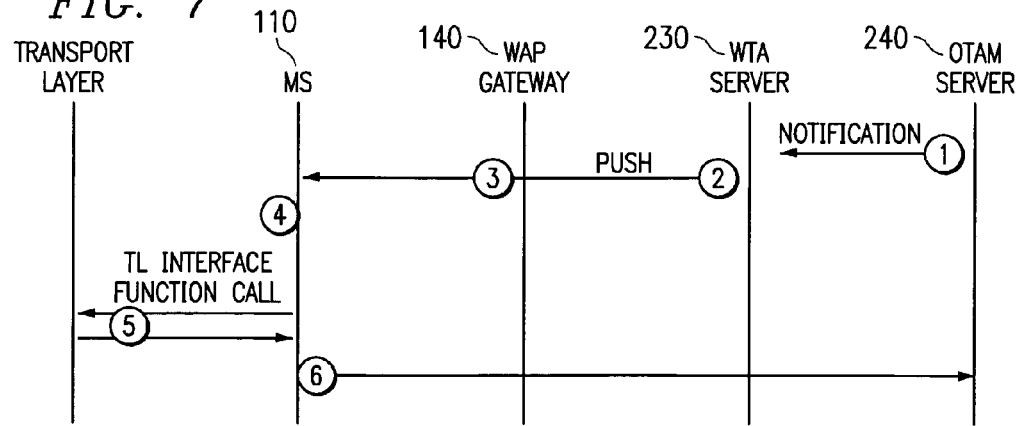
FIG. 7 is a session diagram showing Over the Air Software Download (OTASD).

FIG. 7 is a session diagram showing Over the Air Software Download (OTASD). This example is a use case for downloading a new software module to the MS. This is an example only, modifications and variation are deemed to be in the spirit and scope of the present invention. The method/session proceeds as follows:

1. The OTAM Server sends a notification to the WTA Server indicating the availability of a new software or service
2. The WTA Server creates a new service content based on the input it received in step 1 and pushes it to the WAP Gateway.
3. The WAP Gateway sends a service indication to the client using (SI) Push or standard PUSH. This SI contains the Identifier of the Software module. If user interaction is required a message is also sent.
4. If user interaction is required, the user chooses to update the software or service.
5. The OTAM Agent calls a TL Interface function to download the software using a TCP/IP based protocol or calls a Signaling layer function to download the software using signaling messages (Data Burst messages in the case of CDMA bearer).

The user-agent sends an acknowledgement back to the OTAM Server is the downloading is successful. Otherwise sends an error message.

As will be recognized by those skilled in the art, the innovative concepts described in the present application may be modified and varied over a tremendous range of applications, and accordingly the scope of patented subject matter is not limited by any of the specific exemplary teachings given.

What is claimed is:

1. A system for over the air parameter administration of a mobile station in a network, said system comprising:
    a first server for receiving an indication of a changed parameters in the mobile station and sending a notification;
    a second server for receiving the notification with the changed parameters and creating a new service content based on the changed parameters; and
    a gateway for receiving a pushed uniform resource locator (URL) of the second server and for sending a service indication to a client and converting at least one protocol signal.

2. A mobile station arranged to be managed over the air in a network, said mobile station comprising:
    a user interface for interfacing with a user of the mobile station;
    a signaling layer interface for interfacing with the network;
    an over the air management agent for processing at least one management message including a uniform resource locator (URL) of a server, initiating an appropriate management action and interfacing with the signaling layer; and
    managed objects which are accessed by the over the air management agent and used to update at least one parameter indicated to the server as being changed and diagnosing the mobile station over the air.

3. An apparatus comprising an over the air management agent configured for:
    processing at least one management message including a uniform resource locator (URL) of a server;
    initiating an appropriate management action, interfacing with a signaling layer; and
    accessing managed objects to update at least one parameter indicated to the server as being changed for diagnosing the mobile station over the air.

* * * * *